United States Patent
Yokoyama

[11] Patent Number: 5,883,348
[45] Date of Patent: Mar. 16, 1999

[54] SWITCH MOUNTING STRUCTURE

[75] Inventor: Toshiaki Yokoyama, Tokyo, Japan

[73] Assignee: Niles Parts Co., Ltd., Japan

[21] Appl. No.: 864,361

[22] Filed: May 28, 1997

[51] Int. Cl.⁶ .................................................. H01H 9/00
[52] U.S. Cl. ................................. 200/61.54; 200/61.27; 200/295; 439/15
[58] Field of Search .................................... 280/779, 731; 200/61.27, 61.3, 61.34, 61.35, 61.54, 293, 294, 295, 296; 439/15, 164

[56] References Cited

U.S. PATENT DOCUMENTS

| | | | |
|---|---|---|---|
| 4,255,007 | 3/1981 | Michaels et al. | 339/88 R |
| 5,382,172 | 1/1995 | Klier et al. | 439/164 |
| 5,474,323 | 12/1995 | Davidson | 280/728.2 |
| 5,599,039 | 2/1997 | Goss et al. | 280/728.2 |
| 5,747,763 | 5/1998 | Uchiyama et al. | 200/61.54 |

*Primary Examiner*—Paul N. Dickson
*Attorney, Agent, or Firm*—Ronald P. Kananen; Rader, Fishman & Grauer

[57] ABSTRACT

A switch mounting structure for fixing integrally, securely and firmly a rotary connector, a switch base, and a bracket mounted to a steering column of a vehicle, by an easy single operation. The switch mounting structure has first frame members 3d having opening portions 3c formed therein provided on a fixing case 3 of a rotary connector 1, and second frame members 7c having opening portions 7b formed therein provided on a bracket 7 of the rotary connector 1. The first frame members 3d are engaged with first elastic engaging portions 5e in first engaging portions 5a provided in a base 5 of a switch 4 by a simple single action. Similarly, the second frame members 7c are engaged with second elastic engaging portions 5h in second engaging portions 5c by a simple single action.

2 Claims, 2 Drawing Sheets

SWITCH MOUNTING STRUCTURE

BACKGROUND OF THE INVENTION

1. Field of the Invention

The present invention relates generally to a switch mounting structure for an automobile and, in particular, to a switch mounting structure in which a rotary connector of an automobile is fixed to a base of a switch, such as a combination switch, and the base is fixed to a bracket mounted on a steering column of the vehicle to thereby integrally fix the rotary connector, the switch base, and the bracket.

2. Description of the Prior Art

A conventional switch mounting structure used with an electric connecting device mounted between the steering wheel and the steering column of a vehicle steering apparatus is disclosed in Japanese Utility Model Publication No. Hei 3-48867. The rotary connector of an automobile utilizing this technology is fixed to the base of a switch, such as a combination switch, with four screws. The combination switch has mounted therein, for example, a turn signal switch, a wiper switch, and the like. The base of the combination switch is fixed to the steering column with three or more additional screws.

The conventional switch mounting structure described above requires a large number of screws to be used, as well as a large number of assembly processes for fixing with the screws and a large number of screw management processes. The assembly process for the conventional switch mounting structure is, therefore, relatively complicated and results in an increase in the production cost and the lowering of assembly quality. These drawbacks with the conventional switch mounting structure result primarily because the rotary connector of the vehicle is first fixed to a switch base, such as a combination switch, and then the switch base is fixed to a steering column with other screws.

SUMMARY OF THE INVENTION

Therefore, an object of the present invention is to solve the above problems by providing a switch mounting structure in which a rotary connector, a switch base and a bracket can be integrally fixed securely and firmly in a single operation by elastically engaging first frame members each having an opening provided on a rotary connector and second frame members each having an opening portion inside thereof provided on a bracket, with first elastic fixing portions in first engaging portions and second elastic fixing portions in second engaging portions provided in a switch base, respectively.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

According to the present invention, in order to solve the problems described above, there is provided a rotary connector having first frame members each projecting downward and having an opening formed therein; a bracket having second frame members each projecting upward and having an opening formed therein; and a switch base having first engaging portions with which the first frame members are engaged, first elastic engaging portions each having a pawl piece engaging with an inner surface of the opening formed in one of the first frame members, second engaging portions with which the second frame members are engaged, and second elastic engaging portions each having a pawl piece engaging with an inner surface of the opening formed in one of the second frame members.

The first frame members and the second frame members are formed in an appropriate shape, such as a square shape or a rectangular shape. A single screw is passed through a first screw insertion hole in the rotary connector and a second screw insertion hole in the switch base and fit to a screw-threaded hole in the bracket.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE PREFERRED EMBODIMENT

A switch mounting structure according to a preferred embodiment of the present invention will now be described with reference to FIGS. 1 to 3 of the drawings.

The switch mounting structure according to the present invention provides an optimum means for fixing integrally the rotary connector, the switch base, and the bracket mounted on the steering column securely and firmly. The rotary connector incorporates a cable reel for electrically connecting the steering wheel and the steering column in the steering apparatus of a vehicle, such as an automobile. The switch base is preferably part of a combination switch containing a turn signal switch, a wiper switch, and the like.

According to the switch mounting structure of the present invention, first and second frame members each having an inside opening portion are provided on the rotary connector and the bracket, respectively. The first and second frame members are engaged with first and second elastic fixing portions in first and second engaging portions provided respectively in the switch base. With this switch mounting structure, the rotary connector, the switch base, and the bracket can be integrally fixed securely and firmly by a single action.

Hereinafter, embodiments of the present invention will be described. FIG. 1 is a perspective view schematically showing a disassembled structure of a switch mounting structure according to a preferred embodiment of the present invention. The switch mounting structure is used to integrally fix a rotary connector, a switch base and a bracket of a vehicle. FIG. 2 is an enlarged sectional view of part A surrounded by a dot-and-dash line in FIG. 1, and FIG. 3 is an enlarged sectional view of part B surrounded by a dot and-dash line in FIG. 3.

Figure 1:
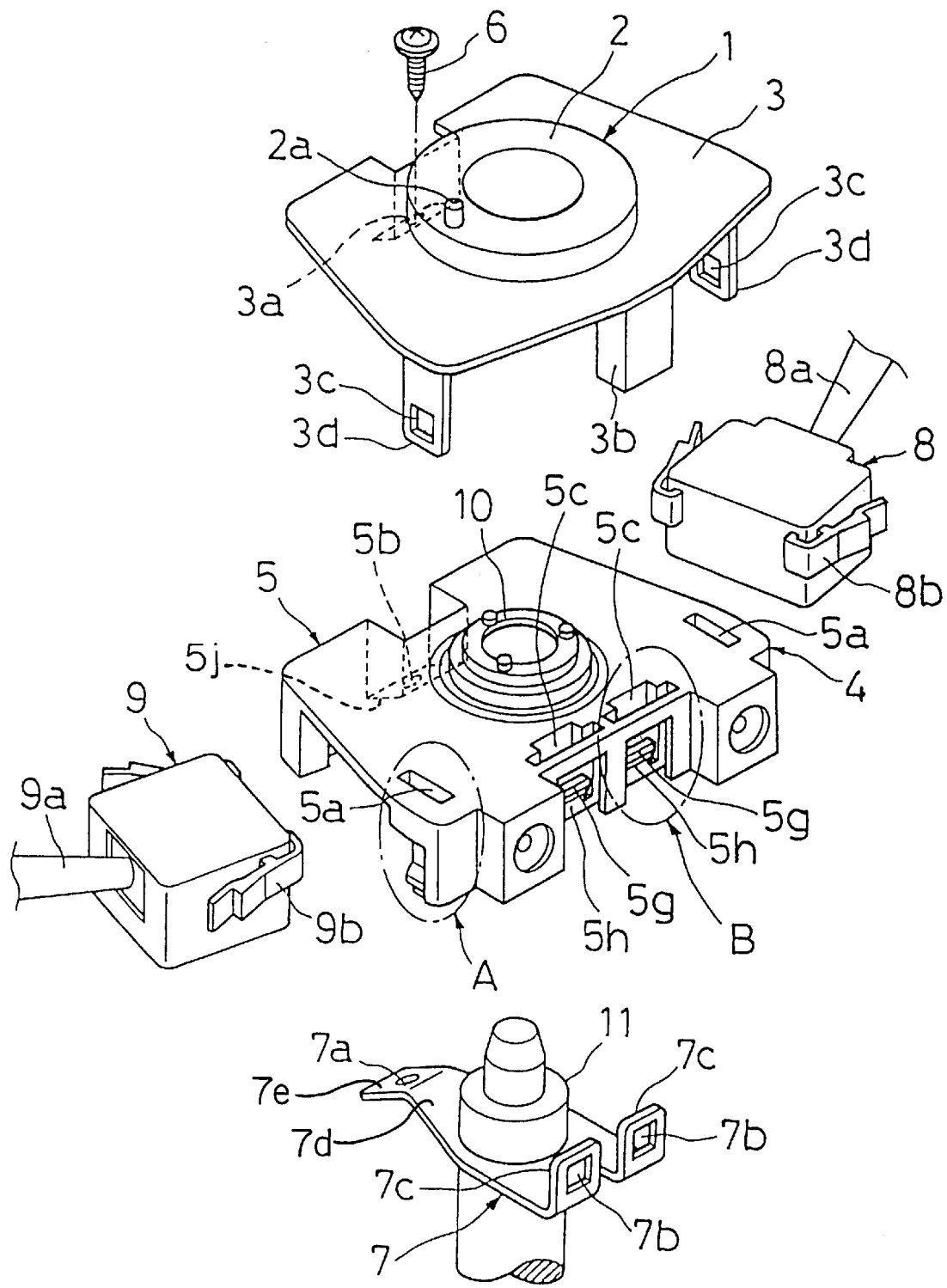
FIG. 1 is a disassembled perspective view schematically showing a switch mounting structure according to a preferred embodiment of the present invention for integrally fixing a rotary connector, switch base and bracket of a vehicle.
Figure 2:
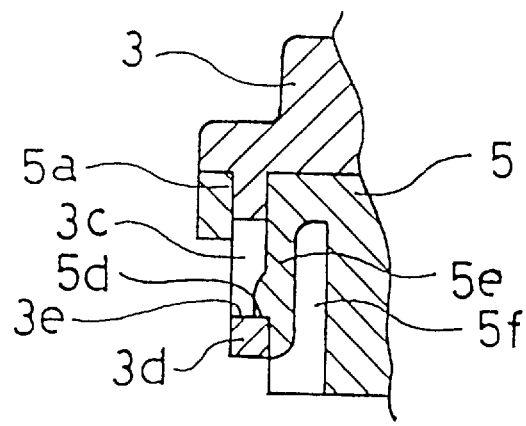
FIG. 2 is an enlarged sectional view showing the construction of part A surrounded by a dot-and-dash line in FIG. 1.
Figure 3:
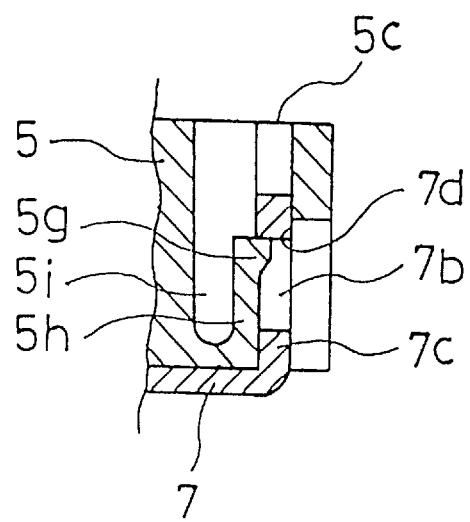
FIG. 3 is an enlarged sectional view showing the construction of part B surrounded by a dot-and-dash line in FIG. 1.

Referring to FIGS. 1 to 3, a rotary connector 1 is formed in a substantially donut shape and incorporates a cable reel (not shown). This rotary connector 1 comprises a rotary case 2 which is engaged with a steering wheel (not shown), and a fixing case 3 which is fixed to a base 5 of a switch 4, such as a combination switch.

The rotary case 2 has a protruding rod 2a which is formed on the top surface thereof so as to engage with a blind hole (not shown) provided in a bottom surface of the steering wheel. The rotary case 2 is rotatably fixed to the fixing case 3 and rotated together with the steering wheel by engaging the protruding rod 2a with the blind hole on the bottom surface of the steering wheel.

The fixing case 3 has a connector 3b, which is connected to the other end of the cable reel, incorporated in the rotary connector 1, and first frame members 3d each having an opening portion 3c extending therethrough. The first frame members 3d project downward from the fixing case 3 of the rotary connector 1. A first screw insertion hole 3a is also formed in the fixing case 3. The fixing case 3 is located at a desired position relative to the base 5 by engaging the first frame members 3d with first engaging portions 5a formed in the base 5.

The first screw insertion hole 3a in the fixing case 3 is provided in line with a second screw insertion hole 5b in the base 5 and a screw-threaded hole 7a in a bracket 7. The fixing case 3 is fixed to the bracket 7 together with the base 5 with a single screw 6.

The length of the first frame members 3d of the fixing case 3 is smaller than the thickness of the base 5 so that ends of the first frame members 3d do not project from the bottom surface of the base 5 when the first frame members 3d are engaged with the first engaging portions 5a. The number of the first frame members 3d is not restricted to a particular number but may be one or more. Further, the positions in which the first frame members 3d are provided are not restricted to any particular place. It is possible to form the first frame members 3d in the base 5, and to form the first engaging portions 5a on the fixing case 3.

The switch 4 comprises a combination switch having, for example, the base 5, a turn signal switch 8, and a wiper switch 9. The switch 4 may be so constructed that the turn signal switch 8 and the wiper switch 9 are integrated with the base 5. Alternatively, the switch 4 may be constructed such that the turn signal switch 8 and the wiper switch 9 can be freely disengaged from the base 5.

The base 5 has a cylindrical cancel member 10 in the center thereof, which is freely rotatable for automatically restoring an operation lever 8a of the turn signal switch 8. The base 5 has the second screw insertion hole 5b provided on a peripheral part thereof, and a lower surface 5j surrounding the second screw insertion hole 5b which extends at an angle corresponding to a sloped surface 7e of the bracket 7 containing the screw-threaded hole 7a, as shown in FIG. 1. The base 5 also has second engaging portions 5c which are located at positions opposing the second screw insertion hole 5b. The positions of the first engaging portions 5a and the second engaging portions 5c are not restricted to particular places.

As shown in FIG. 2, the first engaging portions 5a of the base 5 have first elastic fixing portions 5e each having a pawl portion 5d which is engaged with an inner surface 3e in the opening portion 3c provided in the first frame member 3d. The first elastic engaging portions 5e of the base 5 have elasticity because of blind holes 5f provided in the rear of the pawl portions 5d.

The bracket 7 is mounted onto a steering column 11. As shown in FIG. 1, bracket 7 is a plate member having a planar main body 7d, a sloped surface 7e containing the screw-threaded hole 7a which extends at an angle downwardly and outwardly from the planar main body 7d, and second frame members 7c each having an opening portion 7b formed therein at a side opposing the screw-threaded hole 7a formed on the peripheral portion. The second frame members 7c of the bracket 7 project upward from the planar main body 7d. The number of second frame members 7c may be one or more, and the positions in which the second frame members 7c are provided are not restricted to any particular places.

The length of the second frame members 7c is shorter than the thickness of the base 5 so that ends of the second frame members 7c do not project from the top surface of the base 5 when the second frame members 7c are engaged with the second engaging portions 5c of the base 5. It is possible to form the second frame members 7c on the base 5 and to form the second engaging portions 5c on the bracket 7.

As shown in FIG. 3, the second engaging portions 5c of the base 5 have second elastic engaging portions 5h each having a pawl piece 5g which is engaged with an inner surface 7d in an opening portion 7b provided in the second frame member 7c of the bracket 7. The second elastic engaging portions 5h of the base 5 have elasticity because of blind holes 5i provided in the rear of the pawl pieces 5g.

The operation lever 8a of the turn signal switch 8 has such functions as, for example, direction indicator, lighting switch, passing switch, main dimmer switch, and the like. An operation lever 9a of the wiper switch 9 has such functions as, for example, a wiper washer switch, wiper intermittent volume, and the like. As shown in FIG. 1, the turn signal switch 8 and the wiper switch 9 are detachably mounted to the base 5 with engaging members 8b and 9b, respectively, made of elastic material. The turn signal switch 8 and the wiper switch 9 are mounted to the base 5 by forcing them into the base 5.

The first frame members 3d are formed on the fixing case 3 so as to project downward, and the second frame members 7c are formed on the bracket 7 so as to protrude upward. The first and second frame members 3d, 7c may be formed in any appropriate shape, such as a rectangular shape or a square shape, as shown in FIG. 1.

The switch mounting structure according to the present invention has the above-mentioned structure. Next, the assembly and operation thereof will be described with reference to FIGS. 1 to 3.

First, the bracket 7 is firmly mounted to the steering column 11. Next, the second frame members 7c of the bracket 7 are inserted into the second engaging portions 5c of the base 5. The base 5 is fixed to the bracket 7 by a single action and located at predetermined positions by engaging the pawl pieces 5g of the second elastic engaging portions 5h provided in the second engaging portions 5c with the inner surfaces 7d in the opening portions 7b of the second frame members 7c. Consequently, the screw-threaded hole 7a in the bracket 7 is in line with the second screw insertion hole 5b in the base 5.

Next, the first frame members 3d of the fixing case 3 forming the rotary connector 1 are inserted into the first engaging portions 5a in the base 5. The fixing case 3 is thereby fixed to the base 5 by a single action and located at predetermined positions by engaging the pawl pieces 5d of the first elastic fixing portions 5e provided in the first engaging portions 5a with the inner surfaces 3e in the opening portions 3c of the first frame members 3d. Consequently, the first screw insertion hole 3a of the fixing case 3 is in line with the second screw insertion hole 5b in the base 5 and the screw-threaded hole 7a in the bracket 7.

Next, a single screw 6 is passed through the first screw insertion hole 3a in the fixing case 3 and the second screw insertion hole 5b in the base 5 and then threaded into the screw-threaded hole 7a in the bracket 7. Consequently, the fixing case 3 is firmly fixed to the base 5, and the base 5 is also firmly fixed to the bracket 7.

According to the present invention, there is provided a switch mounting structure comprising: a rotary connector having first frame members each having an opening portion inside thereof provided so as to project downward; a bracket having second frame members each having an opening portion inside thereof provided so as to project upward; and a switch base having first engaging portions with which the first frame members are engaged, first elastic engaging portions each having a pawl piece engaging with the inner surface of an opening portion in the first frame member, second engaging portions with which the second frame members are engaged, and second elastic engaging portions each having a pawl piece engaging with the inner surface of an opening in the second frame member. With this construction, the rotary connector, the switch base, and the bracket can be integrally fixed securely and firmly by a simple single action, so that the assembly process is simplified as compared to the conventional switch mounting structure. As a result, the cost of the assembled product can be reduced and the assembly quality can be improved.

Because the first and second frame members are formed in an appropriate shape, such as a square shape or a rectangular shape, shapes of the first frame members and the second frame members can be selectively determined to be appropriate shapes based on the kind of configurational structure of the rotary connector, the switch base, and the bracket which are integrally fixed by a simple single operation.

Because a single screw is passed through a first screw insertion hole in the rotary connector and a second screw insertion hole in the switch base and threaded into a screw-threaded hole in the bracket, a structure in which the rotary connector, the switch base, and the bracket are integrally fixed by a simple single operation can be structured to a further firm structure capable of sufficiently resisting vibrations or the like of a vehicle.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

What is claimed is:

1. A switch mounting structure, comprising:
    a rotary connector for electrically connecting electrical components in a steering wheel of a vehicle to a steering column of the vehicle, the rotary connector having a first screw insertion hole and a plurality of first frame members which project downward, each of said first frame members having an opening formed therethrough;
    a bracket securable to the steering column of the vehicle, said bracket comprising a plate member having a planar main body, a sloped surface extending at an angle downwardly and outwardly from said planar main body, a screw-threaded hole provided in said sloped surface, and a plurality of second frame members which project upward from said planar main body on a side of said bracket opposite from said sloped surface, each of said second frame members having an opening formed therethrough; and
    a switch base positioned between said bracket and said rotary connector, said switch base comprising:
        a second screw insertion hole in alignment with said first screw insertion hole of said rotary connector and said screw-threaded hole of said bracket, said switch base having a lower surface surrounding said second screw insertion hole and extending at an angle corresponding to the angle of said sloped surface of said bracket,
        a plurality of first engaging portions with which said first frame members are engaged,
        a plurality of first elastic engaging portions each having a pawl piece engaging with a respective one of the openings formed through said first frame members,
        a plurality of second engaging portions with which said second frame members are engaged, and
        a plurality of second elastic engaging portions each having a pawl piece engaging with a respective one of the openings formed through said second frame members.

2. The switch mounting structure as claimed in claim 1, wherein a single screw is passed through said first screw insertion hole in said rotary connector and said second screw insertion hole in said switch base and screw-fitted into said screw-threaded hole in said bracket.

* * * * *